(12) United States Patent
Rozman et al.

(10) Patent No.: US 8,209,107 B2
(45) Date of Patent: Jun. 26, 2012

(54) ELECTRIC MOTOR FOR FUEL PUMP WITH IMPROVED SHUTDOWN FEATURES

(75) Inventors: Gregory I. Rozman, Rockford, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1101 days.

(21) Appl. No.: 12/018,408

(22) Filed: Jan. 23, 2008

(65) Prior Publication Data

US 2009/0187326 A1 Jul. 23, 2009

(51) Int. Cl.
F02D 41/02 (2006.01)
F02M 37/08 (2006.01)
G06F 19/00 (2011.01)

(52) U.S. Cl. ........................ 701/104; 123/497

(58) Field of Classification Search .................. 701/102, 701/107, 112–115; 123/472, 478–481, 497–502, 123/198 D, 198 DC, 198 DB, 198 C, 198 F
See application file for complete search history.

(56) References Cited

U.S. PATENT DOCUMENTS

| | | | |
|---|---|---|---|
| 3,581,179 A | 5/1971 | Jones | |
| 4,031,407 A * | 6/1977 | Reed | 307/87 |
| 4,729,218 A * | 3/1988 | Haselbauer et al. | 60/802 |
| 5,214,311 A | 5/1993 | Kageyama et al. | |
| 5,444,342 A | 8/1995 | Matsuo et al. | |
| 5,689,398 A | 11/1997 | Miller et al. | |
| 5,769,134 A * | 6/1998 | Kenney et al. | 141/59 |
| 5,937,829 A * | 8/1999 | Endou | 123/497 |
| 6,070,760 A * | 6/2000 | Kenney et al. | 222/55 |
| 6,108,179 A | 8/2000 | Katae et al. | |
| 6,209,309 B1 | 4/2001 | McArthur | |
| 6,401,446 B1 | 6/2002 | Gibbons | |
| 6,401,684 B2 * | 6/2002 | Hori et al. | 123/198 F |
| 6,526,946 B1 * | 3/2003 | Kanno | 123/493 |
| 6,626,154 B1 * | 9/2003 | Kanno | 123/486 |
| 6,666,015 B2 | 12/2003 | Dyer | |
| 6,891,346 B2 | 5/2005 | Simmons et al. | |
| 6,901,326 B2 * | 5/2005 | Bolz et al. | 701/102 |
| 6,935,168 B2 * | 8/2005 | Shimoyama | 73/114.28 |
| 7,054,737 B2 * | 5/2006 | Degner et al. | 701/115 |
| 7,216,487 B2 | 5/2007 | Parsons | |
| 7,412,953 B2 * | 8/2008 | Shimazaki et al. | 123/179.16 |
| 2004/0135436 A1 | 7/2004 | Gilbreth et al. | |
| 2005/0146221 A1 * | 7/2005 | Pettigrew | 307/64 |
| 2007/0175454 A1 * | 8/2007 | Shimazaki et al. | 123/497 |
| 2007/0210584 A1 * | 9/2007 | Stahlhut et al. | 290/52 |
| 2009/0045292 A1 | 2/2009 | Maddali et al. | |
| 2009/0206818 A1 * | 8/2009 | Horan | 323/311 |

OTHER PUBLICATIONS

Search Report Dated Apr. 30, 2009.

* cited by examiner

*Primary Examiner* — Willis Wolfe, Jr.
*Assistant Examiner* — Johnny Hoang
(74) *Attorney, Agent, or Firm* — Carlson, Gaskey & Olds, PC

(57) ABSTRACT

An electric motor for a fuel pump is provided with a shutdown switch positioned intermediate an inverter, and its control coil. In this location, the shutdown function can be achieved without heavy components. In another feature, when the fuel pump is shut down, a signal is sent upstream to a voltage regulator associated with a generator, such that the voltage supplied downstream by the generator can be reduced to eliminate any potential voltage spike due to the shutdown of the electric motor. The electric motor with shutdown switch enables low weight fault tolerant flux regulated machines.

21 Claims, 4 Drawing Sheets

ELECTRIC MOTOR FOR FUEL PUMP WITH IMPROVED SHUTDOWN FEATURES

BACKGROUND OF THE INVENTION

This application relates to a control for a fuel pump, wherein the fuel pump motor can be stopped quickly with simple controls.

Electric motor controls are becoming more and more complex. Typically, three phases of power are supplied to a stator to drive a rotor for the electric motor. In addition, a control coil controls the operation of the motor. An inverter is provided with a gate drive, and controls the flow of the power to coils associated with the three phases.

It is known to have a buck regulator upstream of the inverter, and acting to control the voltage supply from a voltage source to the inverter.

In many applications, it becomes necessary to stop the flow of fuel under certain emergency conditions. As an example, if the motor experiences high current spikes, voltage spikes, etc., it is desirable to stop the operation of the electric motor immediately. Further, other conditions, such as a fire, fuel leakage, etc., would point to immediately stopping the electric motor. Thus, it is desirable to stop a fuel pump within a matter of milliseconds once a decision is made to stop the fuel pump.

Fuel pumps of the above sort become particularly challenging to control when mounted to provide fuel to a gas turbine engine on an aircraft. In such applications, the size and weight of the control become critical. It always desirable to decrease the weight of components associated with aircraft engines.

In the prior art, the shut off signal for the electric motor flowed through the buck regulator. Since, the power flow in the prior art is unidirectional, a transient suppressor device on a dc bus would be required to maintain voltage within specification limits during fast shutdown, when the motor operates in the regenerative mode. In addition, the prior art utilizes control winding not only as a protective device in the dual redundancy arrangement, but as a buck regulator inductor. This required that the size and weight of the control be larger than would be desirable.

SUMMARY OF THE INVENTION

In the disclosed embodiment of this invention, a shut off switch for an electric motor to drive a fuel pump is positioned to open a circuit adjacent to a control coil, and downstream of a motor control inverter. Thus, the control is relatively lightweight. In a separate feature, when it is determined that the drive motor for the fuel pump has been entered a regeneration mode for a fast shutdown, a signal is sent back upstream to a control for an associated generator, to reduce the current supplied by the generator to account for an expected voltage spike now that the fuel pump electric motor has been entered a regeneration mode.

These and other features of the present invention can be best understood from the following specification and drawings, the following of which is a brief description.

DETAILED DESCRIPTION OF THE PREFERRED EMBODIMENT

Figure 1:
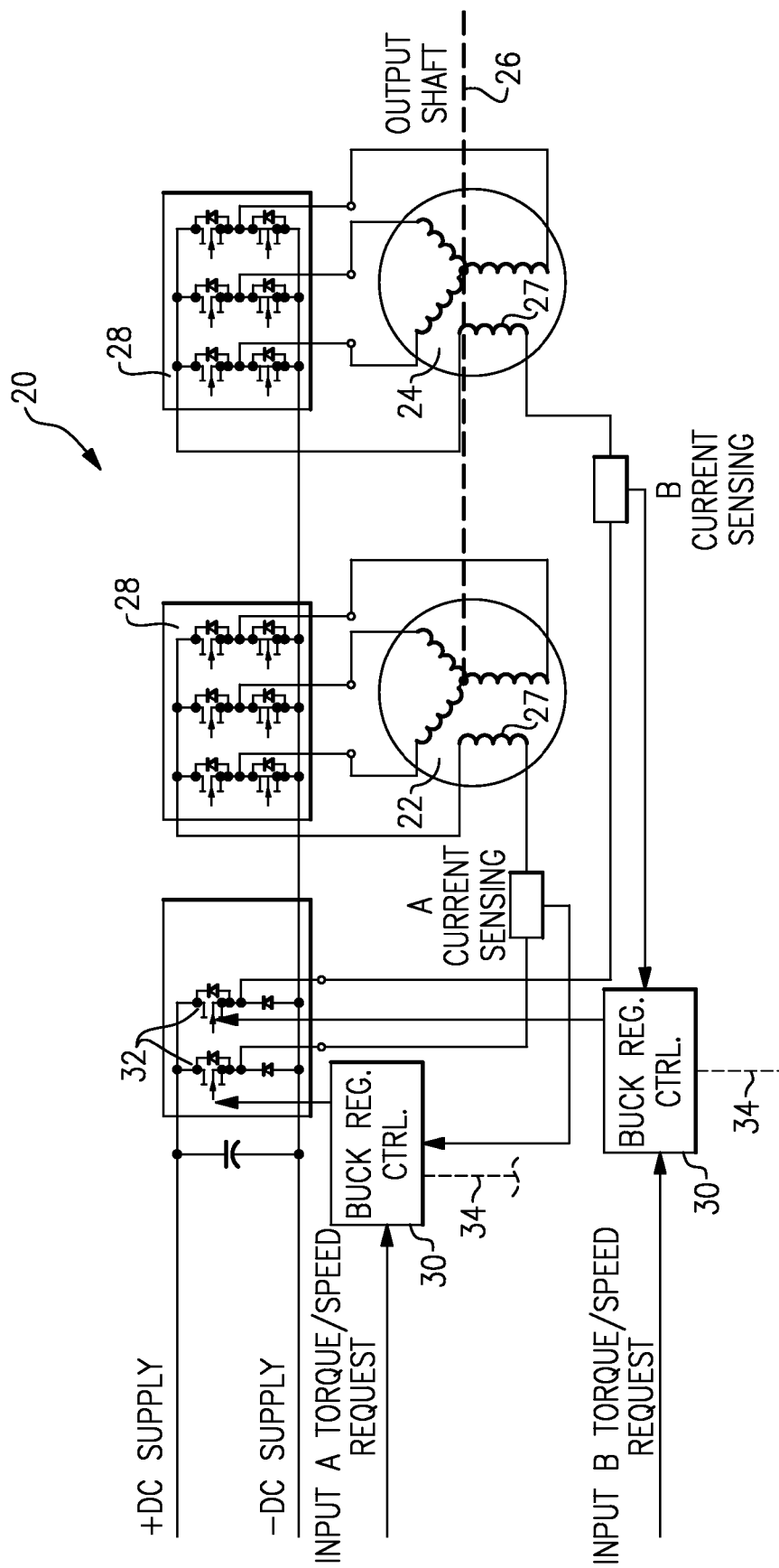
FIG. 1 shows a prior art motor control.

A prior art electric motor control 20 is illustrated in FIG. 1. As shown, a pair of redundant stators 22 and 24 are provided to drive a shaft 26. The stators include three coils associated with three phases of electrical power, and control coils 27.

The buck regulator comprises of a power stage 32, a controller 30 and inductor 27. The buck inductor 27 utilizes a control coil of a regulated permanent magnet machine. The buck regulators control the DC bus current to the inverters 28. In this prior art system, a signal to shut down one of the faulty electric motors 22 or 24 would come from 34, into the buck regulators. This is undesirable, since the control coil is sized to handle full motor power to achieve full torque control and not just for protection. The electromagnetic decoupling in dual redundant arrangement can be achieved by designing the motor with considerably smaller size control winding. The prior art does not includes a transient suppressor (a power resistor connected via power switch to the DC bus) that would be required during fuel pump fast shutdown to keep DC bus voltage within specification limits, when the motor operates in a regenerative mode. This resulted in undesirably heavy components required by the control for the aircraft fuel pump.

Figure 2:
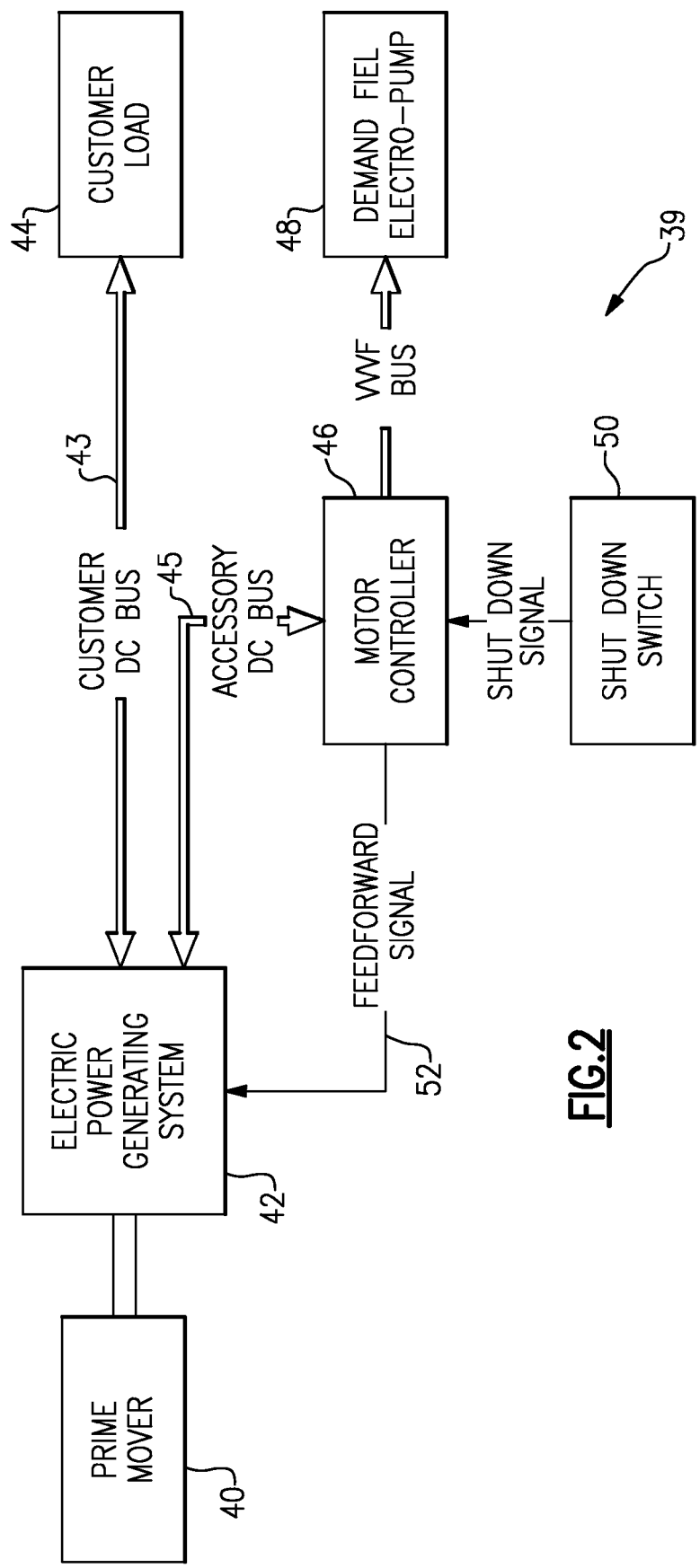
FIG. 2 is a schematic of an overall system incorporating in the present invention.

FIG. 2 is a schematic of an improved system 39. In system 39, a prime mover 40 such as a gas turbine engine, is driven to rotate and generates power by an electric power generating system 42. As known, the power generating system 42 supplies power over a DC bus 43 to customer load 44. The customer load 44 may be any number of components on an aircraft. In addition, an accessory bus 45 supplies power to a motor controller 46, which controls a fuel pump 48. In this basic architecture, the bus 45 may also supply power to a plurality of accessories which are associated with the gas turbine engine, such as a water pump, a fuel pump, and a lubricant pump.

A shutdown switch 50 supplies a shutdown signal to the motor controller 46. When a shutdown signal is received at the motor controller 46, a signal 52 is sent back to the electric power generating system 42.

Figure 3:
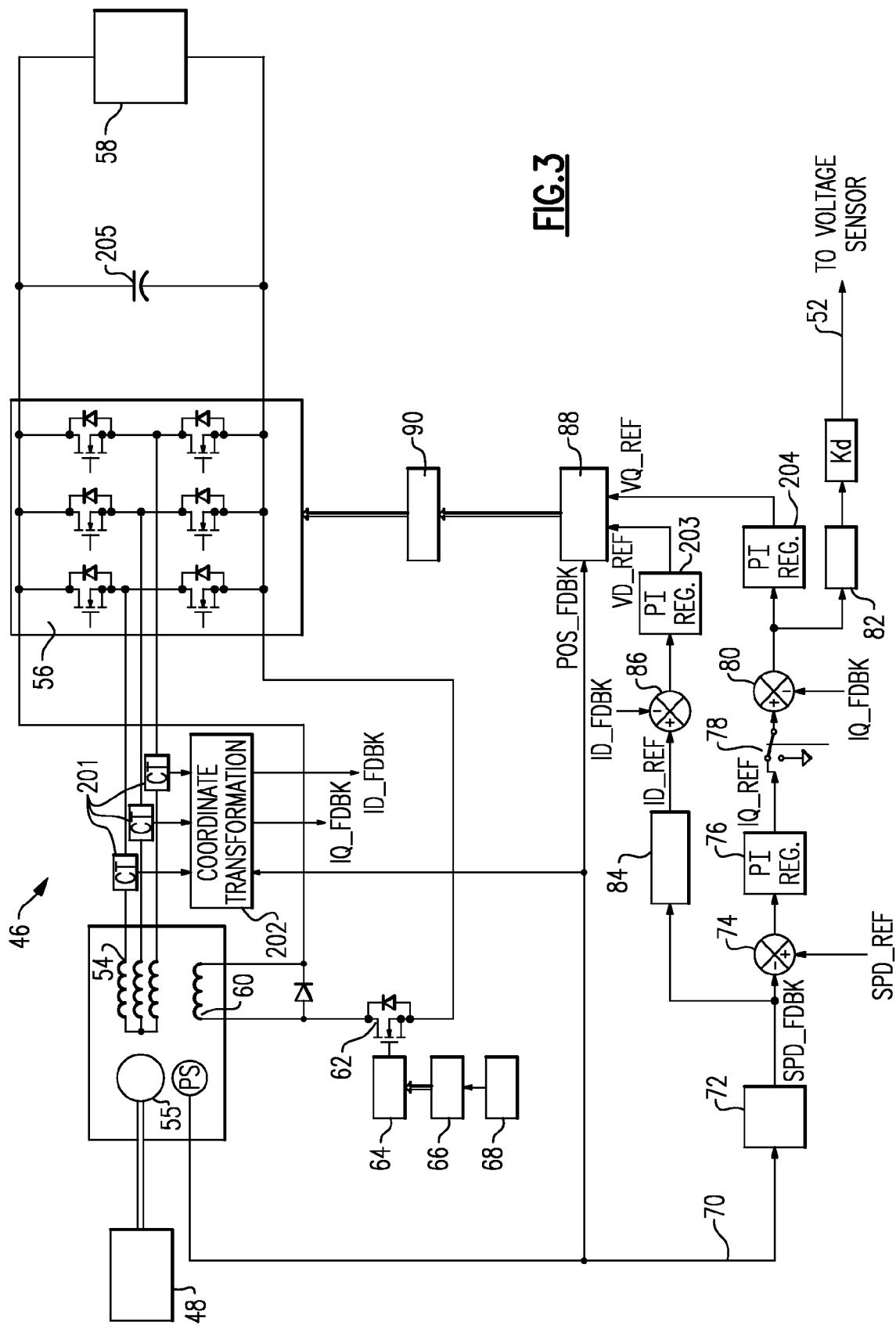
FIG. 3 is a schematic for a fuel pump motor control.

FIG. 3 shows the motor controller 46. As shown, the fuel pump 48 is provided with a rotor 55. The plurality of stator windings 54 receive voltage through an inverter 56. A DC power source 58, which, in a disclosed embodiment, is the accessory bus 45, supplies the power through the inverter 56 to control the current associated with the three phase coils 54, to in turn drive the rotor 55. A control coil 60 is also associated with the stator for the electric motor. A coil control switch 62, which may be a MOSFET, receives a shutdown signal such as shown at 68. A pulse width modulator 66 receives the shutdown signal from 68, and sends a signal through a gate drive 64 to control the switch 62. When the switch 62 is opened, then power no longer flows to the control coil 60, and the motor is no longer driven. In the dual redundant arrangement the control coil 60 would electromagnetically decouple this motor from the second one sharing the same rotor shaft. The signal at 68 may be a signal of a potential problem, such as an over-current, an over-voltage, or some other type of emergency such as a fire or fuel leak. As is clear from the FIG. 3 schematic, the switch 62, which functions as a shut off switch, is positioned intermediate the inverter 56 and the control coil 60, and upstream of the control coil 60, and downstream of the inverter 56, relative to power flow.

The motor control utilizes a current-mode bidirectional voltage source inverter 56. A position feedback signal 70 is sent to a speed detector 72, a coordinate transformation unit 202 and a space vector modulator 88. The coordinate transformation unit 202 derives direct (Id_fdbk) and quadrature (Iq-fdbk) components of stator current from current transducers 201. A comparator 74, which also receives a reference speed signal (spd_ref), produces a speed error signal that is processed by a proportional-integral regulator (PI) 76 to obtain torque producing reference (Iq_ref). A shutdown signal 78 is provided on this line, and may be driven to open when the signal is provided at 68. At this point, the desired current Iq_ref would become zero at the comparator 80. A look-up table 84 produces a direct current reference (Id-ref) as a function of speed. The motor's d and q current loops are closed using comparators 86 and 80, and PI regulators 203 and 204 respectively. The outputs of the current loop PI regulators (Vd_ref and Vq_ref) would then go to a space vector modulator 88, which would in turn control the gate drives 90 to control current in the stator windings 54.

In addition, when there is a zero signal such as a shutdown signal from the switch 78, a differentiator 82 supplies a feed forward signal 52 back to a voltage regulator for the power generating system. This will be explained with regard to FIG. 4.

Figure 4:
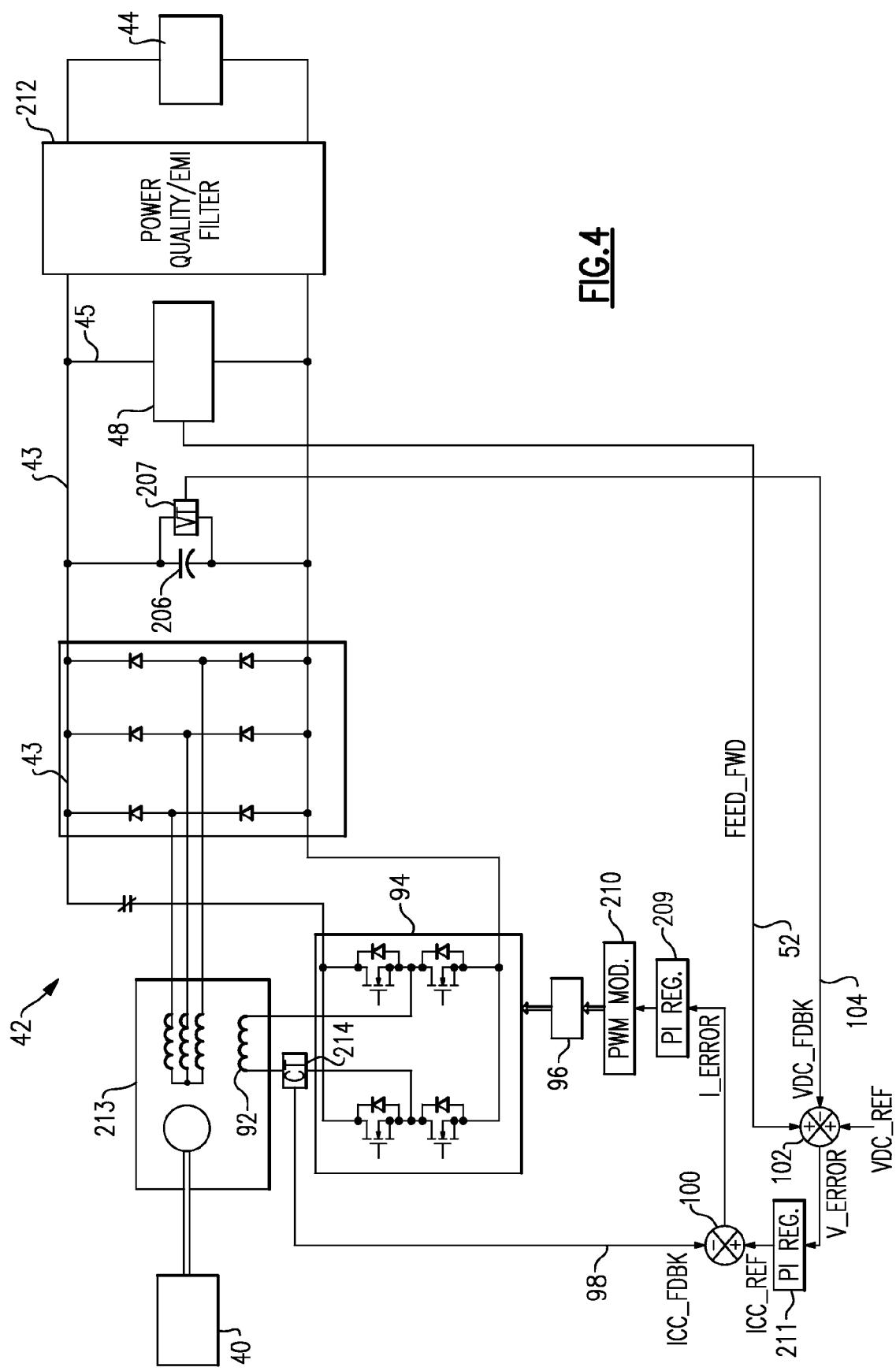
FIG. 4 is a more detailed schematic of the FIG. 3 system.

An electric power generating system 42 is shown in FIG. 4. The prime mover 40, which may be a gas turbine engine, is associated with a generator 213. Generator 213 can be a flux regulated permanent magnet machine with control coil 92. Generator 213 supplies power through a rectifier 43, DC filter is comprised of a capacitor 206, and to a DC bus 43, and the accessory bus 45. Power quality/EMI filter 212 is used to ensure that power quality provided to the customer load meets specification requirements.

The voltage regulation on DC bus 43 is achieved by controlling current in the control winding 92 in response to the feedback voltage (Vdc_fdbk) obtained from the voltage transducer 207, and includes voltage and current loops. The voltage loop includes a comparator 102 and a PI regulator 211. The comparator 102 derives a voltage error between reference (Vdc_ref) and a feedback signal (Vdc_fdbk). In addition, the comparator 102 includes a third input to accommodate a feedforward signal from the motor-pump controller 48 to maintain power quality on DC bus during large transients associated with the motor-pump, such as fast shutdown. The PI regulator 211 produces a current reference signal (Icc_ref) in response to the output of comparator 102.

The current loop includes an H-bridge 94, a current transducer 214, a comparator 100, a PI regulator 209, a PWM modulator 210, and a gate drive 96A comparator 100 derives a current error signal between current reference (Icc_ref) and feedback signal (Icc_ref) obtained form the current transducer 208. This signal is processed by a PI regulator 209 to derive a duty cycle for the PWM modulator 210 that controls the gate drive 96. The H-bridge 94 controls current in the control coil 92 in response to the current reference Icc_ref.

When the fuel pump electric motor is set into regenerative mode to achieve fast shutdown, there could be a spike of voltage supplied downstream through the bus 43. However, by providing the feedforward signal 52 back upstream, the voltage transients on the DC bus 43 can be significantly improved.

In sum, the present invention provides lower weight system to achieve fast shutdown and a fault redundant architecture of an electric motor for a fuel pump. The invention is particularly well suited for use in controlling a fuel pump for a gas turbine engine in an aircraft application.

Although an example embodiment has been disclosed, a worker of ordinary skill in this art would recognize that certain modifications would come within the scope of the claims. For that reason, the following claims should be studied to determine their true scope and content.

What is claimed is:

1. A generator and fuel pump assembly comprising:
   a generator operable to be driven to generate electricity, and supply voltage to a bus;
   said bus providing voltage to an electric motor for a fuel pump;
   said bus including a customer DC bus and an accessory DC bus, said customer DC bus for supplying power to a plurality of electric components, and said accessory bus providing voltage to said electric motor for said fuel pump; and
   a shutdown signal indicating that there is a potential problem such that said electric motor should be shut down, and a controller for said electric motor being operable to stop rotation of said electric motor, and to send a reduce voltage signal back upstream to a voltage regulator for said generator to reduce the voltage sent to said bus.

2. The assembly as set forth in claim 1, wherein said electric motor is provided with an inverter, said inverter receiving power from said bus, and said inverter delivering at least three phases of power to at least three windings associated with a stator for driving a rotor which is part of said electric motor.

3. The assembly as set forth in claim 2, wherein a control coil is also associated with said stator.

4. The assembly as set forth in claim 3, wherein said control coil is positioned downstream of said inverter.

5. The assembly as set forth in claim 4, wherein a shutoff switch to stop the supply of voltage to said control coil is positioned intermediate said control coil and said inverter.

6. The assembly as set forth in claim 5, wherein said shutoff switch is a semiconductor switch provided to open a circuit and stop supply of voltage to said control coil.

7. The assembly as set forth in claim 5, wherein a feedback circuit for controlling the voltage supplied to said windings also has a switch which opens when said shutdown signal is received to stop the supply of voltage to said windings.

8. The assembly as set forth in claim 1, wherein a feedback circuit for said electric motor provides a signal back to the voltage regulator that said electric motor will be stopped, and said voltage regulator then reducing the voltage being supplied on to said bus.

9. The assembly as set forth in claim 1, wherein said problem includes at least one of high current spikes, voltage spikes, fire, or fuel leakage.

10. The assembly as set forth in claim 1, wherein said customer DC bus provides power to a plurality of components for use on an aircraft.

11. The assembly as set forth in claim 1, wherein the reduction of voltage is performed to account for an expected voltage spike as said electric motor enters a regeneration mode.

12. A control for a fuel pump comprising:
   a fuel pump having an electric motor with rotor to drive a shaft for said fuel pump;
   said motor including a plurality of stator windings and a control coil;
   a voltage supply for supplying voltage to said plurality of stator windings and to said control coil, and an inverter positioned intermediate said power supply, and said control and stator coils; and
   a shut off switch for stopping operation of said electric motor, said shut off switch being positioned downstream of said inverter, and upstream of said control coil, said downstream and upstream positions being defined relative to a direction of power flow, and said shut off switch being operable to block supply of voltage to said control coil.

13. The control as set forth in claim 12, wherein a control coil is also associated with said stator.

14. The control as set forth in claim 12, wherein said shutoff switch is a semiconductor device.

15. The control as set forth in claim 12, wherein a feedback circuit for controlling the voltage supplied to said stator windings also has a switch which opens when a shutdown signal is received to stop the supply of voltage to said stator windings.

16. A generator and fuel pump assembly comprising:
   a generator operable to be driven to generate electricity, and supply voltage to a bus;
   said bus providing voltage to an electric motor for a fuel pump;
   a shutdown signal indicating that said electric motor should be shut down, and a controller for said electric motor being operable to stop operation of said electric motor, and to send a reduce voltage signal back upstream to a voltage regulator for said generator to reduce the voltage sent to said bus to account for an expected voltage spike as said electric motor enters a regeneration mode; and
   said electric motor provided with an inverter receiving power from said bus, and said inverter delivering three phases of power to at least three windings associated with a stator for driving a rotor which is part of said electric motor; and
   a shutoff switch to stop the supply of voltage to said control coil positioned intermediate said control coil and said inverter, and said shutdown signal opening said shutoff switch.

17. The assembly as set forth in claim 16, wherein said shutoff switch is a semiconductor device.

18. The assembly as set forth in claim 16, wherein a feedback circuit for controlling the voltage supplied to said stator windings also has a switch which opens when a shutdown signal is received to stop the supply of voltage to said stator windings.

19. The assembly as set forth in claim 16, wherein a feedback circuit for said electric motor provides a signal back to the voltage regulator for said generator that said electric motor will be stopped, and said voltage regulator then reducing the voltage being supplied to said bus.

20. The assembly as set forth in claim 16, wherein said bus includes a customer DC bus and an accessory bus, and said electric motor receiving power from said accessory bus.

21. The assembly as set forth in claim 20, wherein said customer DC bus provides power to a plurality of components for use on an aircraft.

* * * * *